United States Patent [19]

Itatani et al.

[11] 4,338,456

[45] Jul. 6, 1982

[54] METHOD OF PRODUCING BIPHENYLTETRACARBOXYLIC ESTERS

[75] Inventors: Hiroshi Itatani, Chiba; Akinori Shiotani, Ichihara; Akiyoshi Yokota, Unokemachi, all of Japan

[73] Assignee: Ube Industries, Ltd., Chiba, Japan

[21] Appl. No.: 235,744

[22] Filed: Feb. 18, 1981

Related U.S. Application Data

[63] Continuation-in-part of Ser. No. 151,818, May 21, 1980, Pat. No. 4,292,435.

[51] Int. Cl.$^3$ .................................................. C07C 67/343
[52] U.S. Cl. ........................................... 560/96; 560/76
[58] Field of Search ................................. 560/96, 76

[56] References Cited

U.S. PATENT DOCUMENTS

| | | | |
|---|---|---|---|
| 3,784,350 | 7/1973 | Josephson et al. | 560/96 |
| 3,857,874 | 12/1974 | Ichikawa et al. | 560/96 X |
| 4,008,266 | 2/1977 | Intille | 560/96 |

*Primary Examiner*—Natalie Trousof
*Assistant Examiner*—Vera C. Clarke
*Attorney, Agent, or Firm*—Burgess, Ryan and Wayne

[57] ABSTRACT

A biphenyltetracarboxylic tetraester, especially, 3,3',4,4'-biphenyltetracarboxylic tetraalkyl ester, is produced by bringing an orthophthalic diester, especially, orthophthalic dialkylester, into contact with a molecular oxygen-containing gas in the presence of a catalyst consisting of a mixture of a palladium salt with 2,2'-bipyridyl or a chelating reaction product of a palladium salt with 2,2'-bipyridyl, so as to promote oxidative coupling of the orthophthalic diester.

24 Claims, No Drawings

METHOD OF PRODUCING BIPHENYLTETRACARBOXYLIC ESTERS

The present application is a continuation-in-part of U.S. patent application Ser. No. 151,818 which was filed on May 21, 1980, now U.S. Pat. No. 4,292,435.

FIELD OF THE INVENTION

The present invention relates to a method of producing biphenyltetracarboxylic esters. More particularly, the present invention relates to a method for producing biphenyltetracarboxylic tetraesters by catalytically oxidative coupling an orthophthalic diester.

BACKGROUND OF THE INVENTION

It is known that biphenyl compounds can be produced by oxidative coupling an aromatic compound in an oxygen-containing atmosphere in the presence of a palladium type catalyst by various methods. For example, Japanese Patent Application Publication (Kokoku) No. 48-1054(1973) discloses a method of producing a biphenyl compound by dehydrogenation-dimerizing (oxidative coupling) a benzene type aromatic compound in an oxygen-containing atmosphere in the presence of an organic palladium salt but in the absence of reaction medium under an increased pressure.

Also, it is known that when a conventional oxidative coupling method, for example, the above-mentioned method, for the aromatic compounds, is applied to an orthophthalic ester, the resultant coupling product contains, as major components, 2,3,3',4'-biphenyltetracarboxylic tetraester (a-BPTT) and 3,3',4,4'-biphenyltetracarboxylic tetraester (S-BPTT), and usually, the amount of the a-BPTT is larger than that of the S-BPTT. However, the S-BPTT is useful as a material for producing an aromatic carboxylic dianhydride which is useful as an intermediate for producing an aromatic polyimide resin having excellent tenacity, thermal resistance and electric insulating property. Therefore, the S-BPTT is more industrially valuable than the a-BPTT. Accordingly, it is desirable to provide a new method of oxidative coupling the orthophthalic ester, which method is capable of producing the S-BPTT as a main product with a high degree of yield thereof and the a-BPTT as a by-product with a very low degree of yield thereof. It is preferable that the yield of the S-BPTT be as large as possible and the yield of the a-BPTT be as small as possible.

SUMMARY OF THE INVENTION

An object of the present invention is to provide a method of producing biphenyltetracarboxylic esters, which method is capable of producing 3,3',4,4'-biphenyltetracarboxylic tetraester with a high degree of selectivity thereto.

Another object of the present invention is to provide a method of producing biphenyltetracarboxylic tetraester, in which method the formation of a by-product, for example, 2,3,3',4'-biphenyltetracarboxylic tetraester is restricted.

The above-mentioned objects can be attained by the method of the present invention, which comprises oxidative coupling an orthophthalic diester by flowing a molecular oxygen-containing gas in the form of bubbles through a reaction mixture containing the orthophthalic diester and a catalyst which consists of at least one member selected from the group consisting of:

(A) mixtures of one or more palladium salts with 2,2'-bipyridyl in a molar amount of 0.9 to 4 times that of said palladium salt, and;

(B) chelating reaction products of one or more palladium salts with 2,2'-bipyridyl.

Also, the above-mentioned objects can be attained by another method of the present invention, which comprises oxidative coupling an orthophthalic diester by bringing a reaction mixture containing said orthophthalic diester and a catalyst which consists of at least one member selected from the group consisting of:

(A) mixture of one or more palladium salts with 2,2'-bipyridyl in a molar amount of 0.9 to 4 times that of said palladium salt, and;

(B) chelating reaction products of one or more palladium salts with 2,2'-bipyridyl, into contact with a molecular oxygen-containing atmosphere at a temperature of from 160° to 250° C.

In the above-mentioned methods, the catalyst may contain at least one copper salt.

The methods of the present invention are effective for producing S-BPTT with a high degree of selectivity thereto in such a manner that the molar ratio of the resultant a-BPTT to the resultant S-BPTT is in a range of from 0.01 to 0.6.

DETAILED DESCRIPTION OF THE INVENTION

In the present invention, it is essential that the catalyst for oxidative coupling the orthophthalic diester consists of at least one member selected from (A) mixtures of (a) at least one palladium salt with (b) 2,2'-bipyridyl in a molar amount of 0.9 to 4 times that of said palladium salt and (B) chelating reaction products of (a) at least one palladium salt with (b) 2,2'-bipyridyl.

The orthophthalic diester usable for the present invention is preferably selected from those of the formula (I):

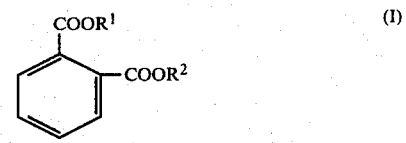

wherein $R^1$ and $R^2$ represent, independently from each other, an alkyl radical having 1 to 4 carbon atoms, respectively.

For example, the orthophthalic diester is selected from the group consisting of dimethyl o-phthalate, diethyl o-phthalate, dipropyl o-phthalate, dibutyl o-phthalate. The orthophthalic diester can be produced by reacting a corresponding alkyl alcohol compound with orthophthalic acid or its anhydride.

The palladium salt usable for the method of the present invention can be selected from the group consisting of palladium salts of organic carboxylic acids, palladium chelate salts of β-diketone compounds, and palladium salts of inorganic acids. The palladium salt is usually selected from the group consisting of palladium salts of aliphatic carboxylic acids having 1 to 5 carbon atoms, for example, palladium formate, palladium acetate, palladium propionate, palladium butylate, and palladium valerate; palladium salts of aromatic carboxylic acids, for example, palladium benzoate, palladium terephthalate; palladium chelate salts, for example, of acetylacetone, benzoylacetone and trifluoroacetylacetone, and;

inorganic palladium salts, for example, palladium nitrate, palladium nitrite and palladium sulfate. Also, the palladium salt usable for the present invention may be in the form of a complex salt. The preferable palladium salts for the present invention are palladium salts of aliphatic monocarboxylic acids having 1 to 3 carbon atoms, more preferably, palladium acetate.

When the catalyst consists of a mixture of at least one palladium salt and 2,2'-bipyridyl, the molar amount of 2,2'-bipyridyl is in a range of from 0.9 to 4 times, preferably, from 0.95 to 3 times, that of the palladium salt.

A molar amount of 2,2'-dipyridyl less than 0.9 times that of the palladium salt, sometimes results in an oxidative coupling reaction which exhibits a poor selectivity to the S-BPTT. Therefore, the resultant product contains the S-BPTT in a smaller amount than that of the a-BPTT. Also, a molar amount of 2,2'-bipyridyl more than 4 times that of the palladium salt, results in a decreased yield of the resultant biphenyltetracarboxylic esters.

The catalyst for the present invention may consist of a chelating reaction product of at least one palladium salt with 2,2'-dipyridyl. The chelating reaction product can be prepared in such a manner that the palladium salt is mixed with 2,2'-bipyridyl by dissolving them in an organic solvent, for example, benzene, xylene, acetone, methylene dichloride or chlorobenzene, the solution is stirred at room temperature for a period of time between one half and ten hours to complete the chelating reaction, and then, the resultant product is isolated from the reaction mixture by removing the organic solvent.

In the chelating reaction, it is preferable that the molar ratio of the palladium salt to 2,2'-dipyridyl be in the range of from 1:0.9 to 1:2.5. Also, it is preferable that the palladium salt to be subjected to the chelating reaction be selected from palladium salts of aliphatic monocarboxylic acids having 1 to 5 carbon atoms and palladium nitrate. The palladium chelate salt is composed of one palladium atom and one or two 2,2'-bipyridyl molecules.

In the method of the present invention, the catalyst is preferably used in an atomic number of palladium of from 0.0001 to 0.1, more preferably, from 0.002 to 0.01, per molecule of the orthophthalic diester.

In the present invention, the oxidative coupling reaction can be carried out by flowing a molecular oxygen-containing gas in the form of bubbles through the reaction mixture. That is, when the molecular oxygen-containing gas is blown into the reaction mixture, the molecular oxygen-containing gas is mixed in the form of a number of bubbles with the reaction mixture. This type of mixing is most effective for promoting the contact of the oxygen gas with the orthophthalic diester and the catalyst in the reaction mixture.

The oxidative coupling reaction in the method of the present invention is carried out in an atmosphere containing molecular oxygen gas. The oxygen-containing gas may consist of pure oxygen gas alone or a mixture of at least 0.1% by volume, preferably, from 0.1 to 90% by volume, more preferably, from 1 to 80% by volume, of oxygen gas and the balance consist of an inert gas such as nitrogen gas and carbon dioxide.

Also, in order to prevent dangerous accidents, for example, an explosion of the oxidative coupling system, it is preferable that the molecular oxygen-containing gas consist of from 0.5 to 60% by volume, more preferably, from 0.5 to 25% by volume, still more preferably, from 1 to 20% by volume, of oxygen gas and the balance consisting of the inert gas. The molecular oxygen-containing gas may be natural air or a mixture of air with the inert gas or oxygen gas.

It is preferable that the molecular oxygen-containing gas have a partial pressure of oxygen of from 0.05 to 200 atmospheres, more preferably, from 0.1 to 50 atmospheres. When no copper salt is contained in the oxidative coupling reaction mixture, it is preferable that the partial pressure of oxygen in the mixture be at least 1.5 atmospheres, more preferably, 3 or more atmospheres, and still more preferably, from 5 to 100 atmospheres.

It is preferable that the flow rate of the molecular oxygen-containing gas be in a range of from 1 to 20 liters (under a standard condition, that is, at a temperature of 25° C. and a pressure of 1 atmosphere) per minute per liter of the reaction mixture. The blowing of the molecular oxygen-containing gas into the oxidative coupling reaction mixture is advantageous in that the depositing of palladium as a palladium black from the reaction mixture can be prevented even if the partial pressure of oxygen is 5 atmospheres or less. That is, by blowing the molecular oxygen-containing gas into the oxidative coupling reaction mixture, it becomes possible to restrict the production of undesirable by-products and to increase the yield of the desired S-BPTT, even under a partial pressure of oxygen of from 0.1 to 5 atmospheres.

The molecular oxygen-containing gas may be blown into the oxidative coupling reaction mixture in any manner as long as the oxygen is effectively brought into contact with the orthophthalic diester and the catalyst in the reaction mixture. For example, the molecular oxygen-containing gas flows along and/or toward the surface of the reaction mixture contained in a vessel. Otherwise, the molecular oxygen-containing gas is blown into the reaction mixture through one or more blowing nozzles or a perforated plate located below the surface of the reaction mixture contained in a vessel. When the reaction mixture flows through a reaction tube, the molecular oxygen-containing gas may be blown into the reaction tube through at least one hole formed on the peripheral wall of the reaction tube. Otherwise, the molecular oxygen-containing gas may flow occurrently with the reaction mixture through the reaction tube.

The above-mentioned oxidative coupling reaction is preferably carried out at a temperature of from 100° to 300° C., more preferably, from 140° to 230° C., under a pressure of from 1 to 300 atmospheres. When the oxidative coupling reaction temperature is lower than 100° C., sometimes, the oxidative coupling reaction occurs to a very poor extent. Also, an oxidative coupling reaction temperature higher than 300° C. sometimes causes undesirable side-reactions to vigorously occur and the yield of the desired biphenyl compounds to become remarkably poor.

The oxidative coupling reaction may be carried out in the presence of at least one copper salt. In other words, the catalyst may contain, as an additional component, at least one copper salt which may be organic or inorganic.

The copper salt is effective for preventing the palladium from being deposited in the form of palladium black from the oxidative coupling reaction mixture, even when the molecular oxygen-containing gas has a low partial pressure of oxygen. Therefore, in the case where the partial pressure of oxygen in the oxidative coupling reaction reaction, is low, the copper salt is effective for stabilizing the oxidative coupling reaction.

The copper salt is preferably selected from the group consisting of copper salts of aliphatic carboxylic acids having 1 to 5 carbon atoms, for instance, copper formate, copper acetate, copper propionate, and copper oxalate, and; copper chelate salts of β-diketones, for example, acetylacetone and benzoylacetone. Usually, the copper salt is used in a molar amount of from 0.01 to 10 times that of the palladium salt or the palladium chelate salt.

The oxidative coupling reaction for the orthophthalic diester can be effectively carried out by bringing the reaction mixture containing the orthophthalic diester and the catalyst which consists of at least one member selected from the group consisting of:

(A) mixture of one or more palladium salts with 2,2'-bipyridyl in a molar amount of 0.9 to 4 times that of said palladium salt, and;

(B) chelating reaction products of one or more palladium salts with 2,2'-bipyridyl, into contact with a molecular oxygen-containing atmosphere at a temperature of from 160° to 250° C., preferably, 160° to 230° C.

The above-mentioned oxidative coupling reaction is characterized by a relatively high reaction temperature of from 160° to 250° C. That is, it was discovered by the inventors of the present invention when the oxidative coupling reaction temperature is in the range of from 160° to 250° C., the oxidative coupling reaction is remarkably promoted even in the case where the molecular oxygen-containing gas is not flowed in the form of bubbles through the reaction mixture. In this case, the desired 3,3',4,4'-biphenyltetracarboxylic tetraester can be produced in a high degree of selecting thereto and the amount of a by-product, 2,3,3',4'-biphenyltetracarboxylic tetraester, is remarkably small. However, when the oxidative coupling reaction temperature is lower than 160° C., sometimes, the oxidative coupling reaction occurs to a very poor extent. Also, an oxidative coupling reaction temperature higher than 250° C. sometimes causes undesirable side-reactions to vigorously occur and the yield of the desired biphenyl compounds to become remarkably poor.

The oxidative coupling reaction can be effected by using the same catalyst as that mentioned hereinbefore. Also, when the oxygen-containing gas is not flowed in the form of bubbles through the reaction mixture, the oxidative coupling reaction is preferably carried out under a pressure of from 2 to 300 atmosphere, more preferably, from 2 to 100 atmosphere.

The oxidative coupling reaction is carried out in an atmosphere containing molecular oxygen gas. The oxygen-containing atmosphere may consist of pure oxygen gas. However, in order to prevent dangerous accidents, for example, an explosion, it is preferable that the oxygen-containing atmosphere consists of a mixture gas containing a molecular oxygen gas and an inert gas, for instance, nitrogen gas and carbon dioxide gas.

When the oxygen-containing gas is not flowed in the form of bubbles through the reaction mixture, it is preferable that the molecular oxygen-containing atmosphere have a partial pressure of oxygen of from 2 to 200 atmospheres, more preferably, from 2 to 50 atmospheres. When no organic copper salt is contained in the oxidative coupling reaction system, it is preferable that the partial pressure of oxygen in the system be in the range of from 5 to 100 atmospheres.

In the above-mentioned oxidative coupling reaction, the catalyst may contain at least one of the same copper salts as mentioned hereinbefore.

The oxidative coupling reaction mixture for the present invention must not contain certain kinds of organic compounds, for example, dimethylsulfoxide, dimethylformamide, acetonitrile and acetic acid, and inorganic compounds, for example, water. However, it is allowable for the reaction mixture to contain a reaction medium consisting of at least one member selected from the group consisting of liquid organic acid esters, for instance, ethylene glycol diacetate and methyl adipate, and; liquid ketone compounds, for instance, n-butylmethylketone, ethylmethylketone and isopropylethylketone. When the organic acid ester and/or the ketone compounds are used as a reaction medium, sometimes the yield of the biphenyl compounds is increased. However, use of the above-mentioned reaction medium can be dispensed with.

Also, in the present invention, it is not suitable for the oxidative coupling reaction mixture to contain certain kinds of inorganic compounds, for example, sodium acetate, lithium chloride, potassium sulfate and sulfuric acid, even in a small amount. However, it is allowable for the reaction mixture to contain a β-diketone compounds, for instance, acetylacetone and benzoylacetone, and; an organic peroxide compound, for instance, t-butyl peroxide, t-butylhydroxyperoxide and t-butylbenzoate. The above-mentioned diketone and organic peroxide compounds are effective for promoting the oxidative coupling reaction of the orthophthalic diester. Usually, the β-diketone compound is preferably used in a molar amount of 0.5 to 10 times, more preferably, from 0.5 to 4 times, that of the palladium salt or chelate salt. Also, it is preferable that the organic peroxide compound be used in a molar amount of from 2 to 10 times that of the palladium salt of chelate salt.

The present invention is advantageous in that the orthophthalic diester can be converted into biphenyltetracarboxylic tetraesters with a high degree of conversion thereof and the desired S-BPTT can be produced with a high degree of selectivity thereto. That is, the oxidative coupling product from the method of the present invention contains 3,3',4,4'-biphenyltetracarboxylic tetraester (S-BPTT) and 2,3,3',4'-biphenyltetracarboxylic tetraester (a-BPTT), which is in a molar amount of 0.6 times or less, usually, from 0.01 to 0.5 times, that of the 3,3',4,4'-biphenyltetracarboxylic tetraester (S-BPTT).

After the oxidative coupling reaction is completed, palladium in the reaction mixture is preferably recovered by any conventional method. For example, hydrogen gas is blown into the reaction mixture to reduce the palladium compound into metallic palladium, while allowing the resultant metallic palladium to precipitate from the reaction mixture. The precipitate of the metallic palladium can be easily separated from the reaction mixture. In another method, a reducing agent, for example, formic acid and another addition, for example, sodium hydrogen carbonate, is added to the reaction mixture to precipitate metallic palladium. The precipitate of metallic palladium can be recovered from the reaction mixture by means of filtration.

Thereafter, the desired 3,3',4,4'-biphenyltetracarboxylic tetraester can be isolated from the reaction mixture by a conventional method, for example, distillation or crystallization.

The 3,3',4,4'-biphenyltetracarboxylic tetraester produced by the above-mentioned method can be converted to 3,3',4,4'-biphenyltetracarboxylic acid by a conventional method, for example, by hydrolyzing it at an elevated temperature under an increased pressure, or by hydrolyzing it with an acid or alkali. The 3,3',4,4'-biphenyltetracarboxylic acid can be converted to 3,3',4,4'-biphenyltetracarboxylic dianhydride by heating. The 3,3',4,4'-biphenyltetracarboxylic dianhydride is useful as a material for producing an aromatic polyimide resin.

The specific examples presented below will serve to more fully explain how the present invention is practiced. However, it will be understood that these examples are only illustrative and in no way limit the scope of the present invention.

In the examples, the composition of reaction mixture was determined by means of gas chromatography. From the result of the gas chromatographic analysis, the amounts of 2,3,3',4'-biphenyltetracarboxylic tetraester (a-BPTT) and 3,3',4,4'-biphenyltetracarboxylic tetraester (S-BPTT) and by-products (pitch-like substance having a high boiling point) were calculated.

A percent of conversion of an orthophthalic diester, a percent of yield of a product and a percent of selectivity to a product were calculated in accordance with the following equation.

Percent of conversion of o-phthalic diester used $$= \frac{\text{Amount (g) of o-phthalic diester converted}}{\text{Amount (g) of o-phthalic diester used}} \times 100$$

Percent of yield of a product $$= \frac{\text{Amount (g) of a product}}{\text{Amount (g) of o-phthalic diester used}} \times 100$$

Percent of selectivity to a product $$= \frac{\text{Amount (g) of a product}}{\text{Total amount (g) of all products}} \times 100$$

EXAMPLES 1 THROUGH 5 AND COMPARISON EXAMPLE 1

In Example 1, a stainless steel autoclave having a capacity of 270 ml was charged with 425 millimoles (70 ml) of dimethyl orthophthalate and, then, with 0.42 millimoles (0.094 g) of palladium acetate [Pd(O.-CO.CH$_3$)$_2$] and 0.42 millimoles (0.066 g) of 2,2'-bipyridyl, and then, closed. The pressure in the inside of the autoclave was increased to 50 atmospheres by blowing compressed air thereinto and the temperature of the reaction system in the autoclave was elevated to 160° C., and then, maintained at this level for five hours to carry out an oxidative coupling operation for the dimethyl orthophthalate. At the beginning of the oxidative coupling operation, the partial pressure of oxygen in the reaction system was 10 atmospheres. That is, the content of oxygen was 20% by volume.

After the oxidative coupling reaction was completed the resultant reaction mixture was subjected to a gas chromatographic analysis. As a result of the analysis, it was found that the percents of yield of and selectivity to the resultant a-type compound, S-type compound and by-product having a high boiling point were as indicated in Table 1. Table 1 also shows the percent of conversion of dimethyl orthophthalate and the molar ratio (a/s) of the resultant a-BPTT to the resultant S-BPTT.

In order to recover palladium, hydrogen gas was blown into the reaction mixture at a temperature of 200° C., under a pressure of 5 atmospheres on the gauge, for two hours, while allowing the resultant metallic palladium to precipitate from the reaction mixture, and then, the precipitated metallic palladium was removed from the reaction mixture by means of filtration. The amount of the recovered metallic palladium corresponded to about 95% of the amount of palladium contained in the reaction mixture. After the recovery of the metallic palladium, it was found that the content of palladium in the residual reaction mixture was 2.9 ppm or less.

The residual reaction mixture was subjected to a distillation to remove non-reacted dimethyl orthophthalate at a temperature of 110° C. under a pressure of 2 mmHg, and, then, to recover 3,3',4,4'-biphenyltetracarboxylic tetramethyl ester at a temperature of 240° to 270° C. under a pressure of 2 mmHg. Thereafter, the resultant fraction containing 3,3',4,4'-biphenyltetracarboxylic tetramethylester was subjected to a recrystallizing operation by using methyl alcohol. The recrystallized 3,3',4,4'-biphenyltetracarboxylic tetramethylester having degree of purity of 98% or more, was obtained in an recovery yield of 80% or more.

In each of the Examples 2 through 5 and Comparison Example 1, the same procedures as those described in Example 1 were carried out, except that the reaction temperature and the amount of 2,2'-bipyridyl used were as those indicated in Table 1. The results are also indicated in Table 1.

EXAMPLES 6 AND 7

In each of the Examples 6 and 7, the same procedures as those described in Example 1 were carried out, except that the reaction temperature was as indicated in Table 1 and the catalyst contained, as an additional component, 0.42 millimoles of copper acetate. The results are indicated in Table 1.

COMPARISON EXAMPLES 2 AND 3

In Comparison Example 2, the same procedures as those described in Example 3 were carried out, except that no 2,2'-pyridyl was used. The results are indicated in Table 1.

In Comparison Example 3, the same procedures as those described in Example 2 were carried out, except that 2,2'-pyridyl was used in an amount of 0.21 millimoles. The results are indicated in Table 1.

TABLE 1

| Example No. | Amount of dimethyl orthophthalate (m. mole) | Catalyst Pd salt Type | Amount (m. mole) | 2,2'-bipyridyl Amount (m. mole) | Cu-salt Type | Amount (m. mole) | Reaction Temperature (°C.) | Pressure (atm.) Entire | Partial pressure of oxygen | Content of oxygen (vol. %) | Period (hrs) | Type of reaction |
|---|---|---|---|---|---|---|---|---|---|---|---|---|

Com-

TABLE 1-continued

| Example No. | Amount of dimethyl orthophthalate (m. mole) | Catalyst Pd salt Type | Pd salt Amount (m. mole) | 2,2'-bipyridyl Amount (m. mole) | Cu-salt Type | Cu-salt Amount (m. mole) | Temperature (°C.) | Pressure (atm.) Entire | Pressure (atm.) Partial pressure of oxygen | Content of oxygen (vol. %) | Period (hrs) | Type of reaction |
|---|---|---|---|---|---|---|---|---|---|---|---|---|
| Comparison Example 1 | 425 | Pd(OCOCH₃)₂ | 0.42 | 0.42 | — | — | 145 | 50 | 10 | 20 | 5 | Batch |
| Example 1 | 425 | Pd(OCOCH₃)₂ | 0.42 | 0.42 | — | — | 160 | 50 | 10 | 20 | 5 | " |
| 2 | 425 | Pd(OCOCH₃)₂ | 0.42 | 0.42 | — | — | 180 | 50 | 10 | 20 | 5 | " |
| 3 | 425 | Pd(OCOCH₃)₂ | 0.42 | 0.42 | — | — | 200 | 50 | 10 | 20 | 5 | " |
| Example 4 | 425 | Pd(OCOCH₃)₂ | 0.42 | 0.84 | — | — | 220 | 50 | 10 | 20 | 5 | " |
| 5 | 425 | Pd(OCOCH₃)₂ | 0.42 | 0.42 | — | — | 200 | 50 | 10 | 20 | 5 | " |
| 6 | 425 | Pd(OCOCH₃)₂ | 0.42 | 0.42 | Cu(OCOCH₃)₂ | 0.42 | 180 | 50 | 10 | 20 | 5 | " |
| 7 | 425 | Pd(OCOCH₃)₂ | 0.42 | 0.42 | Cu(OCOCH₃)₂ | 0.42 | 200 | 50 | 10 | 20 | 5 | " |
| Comparison Example 2 | 425 | Pd(OCOCH₃)₂ | 0.42 | — | — | — | 200 | 50 | 10 | 20 | 5 | " |
| 3 | 425 | Pd(OCOCH₃)₂ | 0.42 | 0.21 | — | — | 180 | 50 | 10 | 20 | 5 | " |

| Example No. | Conversion (%) | Product a-BPTT Selectivity (%) | a-BPTT Yield (%) | S-BPTT Selectivity (%) | S-BPTT Yield (%) | By-product Selectivity (%) | By-product Yield (%) | Ratio a/s |
|---|---|---|---|---|---|---|---|---|
| Comparison Example 1 | <0.3 | — | — | — | <0.2 | — | — | — |
| 1 | 1.1 | 7 | 0.08 | 67 | 0.73 | 26 | 0.29 | 0.11 |
| 2 | 1.9 | 7 | 0.13 | 71 | 1.34 | 22 | 0.43 | 0.10 |
| 3 | 4.0 | 20 | 0.79 | 48 | 1.91 | 32 | 1.30 | 0.41 |
| Example 4 | 4.8 | 5 | 0.22 | 48 | 2.32 | 47 | 2.26 | 0.10 |
| 5 | 2.3 | 10 | 0.22 | 62 | 1.42 | 28 | 0.66 | 0.15 |
| 6 | 2.40 | 12 | 0.30 | 58 | 1.38 | 30 | 0.72 | 0.22 |
| 7 | 3.84 | 12 | 0.44 | 53 | 2.02 | 35 | 1.38 | 0.22 |
| Comparison Example 2 | 2.42 | 36 | 0.87 | 8 | 0.18 | 56 | 1.37 | 4.75 |
| 3 | 12.65 | 52 | 6.56 | 14 | 1.84 | 34 | 4.29 | 3.56 |

EXAMPLES 8 THROUGH 10

In each of the Examples 8 through 10, a palladium 2,2'-bipyridyl chelate salt was prepared by stirring a mixture of a solution of 0.80 g of 2,2'-bipyridyl dissolved in 100 ml of benzene with another solution of 1.12 g of palladium acetate dissolved in 100 ml of benzene, at at a temperature of 25° C. for about one hour. The resultant precipitate was separated from the mixture by means of filtration, washed with 100 ml of benzene and, then, dried. The amount of the resultant palladium chelate salt was 1.70 g. The same oxidative-coupling procedures as those described in Example 1 were carried out, except that 0.42 millimoles of the obtained palladium chelate salt were used as a catalyst instead of the mixture of palladium acetate and 2,2'-bipyridyl, and the reaction temperature was as indicated in Table 2. The results are also indicated in Table 2.

EXAMPLES 11 AND 12

In each of the Examples 11 and 12, the same procedures as those described in Example 8, except that the reaction temperature was as indicated in Table 2 and the catalyst contained, as an additional component, 0.42 millimoles of copper acetate. The results are indicated in Table 2.

TABLE 2

| Example No. | Amount of dimethyl ortho-phthalate (m. mole) | Catalyst Pd-2,2'-pyridyl chelate compound Amount (m. mole) | Cu-salt Type | Cu-salt Amount (m. mole) | Temperature (°C.) | Pressure (atm.) Entire | Pressure (atm.) Partial pressure of oxygen | Content of oxygen (vol. %) | Period (hrs) | Type of reaction |
|---|---|---|---|---|---|---|---|---|---|---|
| 8 | 425 | 0.42 | — | 0 | 160 | 50 | 10 | 20 | 5 | Batch |
| 9 | 425 | 0.42 | — | 0 | 180 | 50 | 10 | 20 | 5 | " |
| 10 | 425 | 0.42 | — | 0 | 200 | 50 | 10 | 20 | 5 | " |
| 11 | 425 | 0.42 | Cu(OCOCH$_3$)$_2$ | 0.42 | 180 | 50 | 10 | 20 | 5 | " |
| 12 | 425 | 0.42 | " | 0.42 | 200 | 50 | 10 | 20 | 5 | 41 |

| Example No. | Conversion (%) | a-BPTT Selectivity (%) | a-BPTT Yield (%) | S-BPTT Selectivity (%) | S-BPTT Yield (%) | By-product Selectivity (%) | By-product Yield (%) | Ratio a/s |
|---|---|---|---|---|---|---|---|---|
| 8 | 1.71 | 6 | 0.11 | 68 | 1.16 | 26 | 0.44 | 0.09 |
| 9 | 2.40 | 11 | 0.27 | 73 | 1.75 | 16 | 0.38 | 0.15 |
| 10 | 4.43 | 19 | 0.82 | 57 | 2.54 | 24 | 1.07 | 0.32 |
| 11 | 1.33 | 11 | 0.15 | 67 | 0.89 | 22 | 0.29 | 0.17 |
| 12 | 4.48 | 16 | 0.70 | 52 | 2.35 | 32 | 1.43 | 0.30 |

EXAMPLES 13 THROUGH 20

In Example 13, a stainless steel reaction vessel was charged with 1520 millimoles of dimethyl orthophthalate and a catalyst consisting of one millimole of palladium acetate and one millimole of 2,2'-pyridyl. The reaction mixture was subjected to an oxidative-coupling reaction at a temperature of 140° C., under a pressure of 10 atmospheres on the gauge, for seven hours, while blowing a mixture gas of 10% by volume of oxygen and 90% by volume of nitrogen at a supply rate of 2 liters/min. through the bottom of the reaction vessel, and while stirring the reaction mixture with stirring paddles at a rotation speed of 300 r.p.m.

In each of the Examples 14 through 20, the same procedures as those described in Example 13 were carried out, except that the composition of the catalyst used, the reaction temperature and the composition and supply rate of the oxygen-containing gas used were as those indicated in Table 3.

The results of the Examples 13 through 20 are indicated in Table 3.

EXAMPLES 21 THROUGH 25

In each of the Examples 21 through 25, the same procedures as those described in Example 13 were carried out except that the amount of dimethyl orthophthalate used, the composition of the catalyst used, the reaction temperature and the composition and supply rate of the oxygen-containing gas used were as indicated in Table 3.

The results are indicated in Table 3.

TABLE 3

| Example No. | Amount of dimethyl ortho-phthalate (m. mole) | Pd Salt Type | Pd Salt Amount (m. mole) | 2,2'-bipyridyl Amount (m. mole) | Cu-salt Type | Cu-salt Amount (m. mole) | Temperature (°C.) | Pressure (atm.) Entire | Pressure (atm.) Partial pressure of oxygen | Content of oxygen (vol %) | Time (hrs) | Type of reaction | Supply rate of oxygen-containing gas (l/min) |
|---|---|---|---|---|---|---|---|---|---|---|---|---|---|
| 13 | 1520 | Pd(OCOCH$_3$)$_2$ | 1.0 | 1.0 | — | 0 | 140 | 10 | 1 | 10 | 7 | Gas bubble | 2.0 |
| 14 | 1520 | " | 1.0 | 1.0 | — | 0 | 160 | 10 | 1 | 10 | 7 | Gas bubble | 2.0 |
| 15 | 1520 | " | 3.0 | 3.0 | — | 0 | 180 | 10 | 2 | 20 | 7 | Gas bubble | 2.0 |
| 16 | 1520 | " | 3.0 | 3.75 | — | 0 | 180 | 10 | 2 | 20 | 7 | Gas bubble | 2.0 |
| 17 | 1520 | " | 3.0 | 3.0 | — | 0 | 180 | 5 | 1 | 20 | 7 | Gas bubble | 1.0 |
| 18 | 1520 | " | 3.0 | 3.0 | " | 0 | 200 | 10 | 2 | 20 | 7 | Gas bubble | 2.0 |
| 19 | 1520 | " | 3.0 | 3.0 | — | 0 | 200 | 5 | 1 | 20 | 7 | Gas bubble | 1.0 |
| 20 | 1520 | " | 1.0 | 1.6 | — | 0 | 220 | 30 | 1.5 | 5 | 7 | Gas bubble | 2.0 |
| 21 | 608 | " | 1.2 | 1.2 | Cu(OCOCH$_2$)$_3$ | 1.2 | 140 | 1 | 0.2 | 20 | 7 | Gas bubble | 0.3 |
| 22 | 608 | " | 1.2 | 1.2 | " | 1.2 | 160 | 1 | 0.2 | 20 | 7 | Gas bubble | 0.3 |
| 23 | 608 | " | 0.8 | 0.8 | " | 0.8 | 180 | 1 | 0.2 | 20 | 8 | Gas bubble | 0.3 |
| 24 | 608 | " | 0.8 | 0.8 | " | 0.8 | 200 | 1 | 0.2 | 20 | 8 | Gas bubble | 0.3 |
| 25 | 608 | " | 0.8 | 0.8 | " | 0.8 | 180 | 10 | 1 | 10 | 7 | Gas | 0.5 |

TABLE 3-continued

| Example No. | Amount of dimethyl ortho-phthalate (m. mole) | Catalyst Pd Salt Type | Catalyst Pd Salt Amount (m. mole) | Catalyst 2,2'-bipyridyl Amount (m. mole) | Catalyst Cu-salt Type | Catalyst Cu-salt Amount (m. mole) | Temperature (°C.) | Reaction Pressure (atm.) Entire | Reaction Pressure (atm.) Partial pressure of oxygen | Content of oxygen (vol %) | Time (hrs) | Type of reaction | Supply rate of oxygen-containing gas (l/min) bubble |
|---|---|---|---|---|---|---|---|---|---|---|---|---|---|

| Example No. | a-BPTT Conversion (%) | a-BPTT Selectivity (%) | a-BPTT Yield (%) | S-BPTT Selectivity (%) | S-BPTT Yield (%) | By-Product Selectivity (%) | By-Product Yield (%) | Ratio a/s |
|---|---|---|---|---|---|---|---|---|
| 13 | 0.63 | 6 | 0.04 | 78 | 0.49 | 16 | 0.10 | 0.08 |
| 14 | 2.43 | 7 | 0.17 | 73 | 1.77 | 20 | 0.49 | 0.10 |
| 15 | 6.44 | 7 | 0.49 | 88 | 5.68 | 5 | 0.27 | 0.09 |
| 16 | 6.08 | 6 | 0.38 | 89 | 5.40 | 5 | 0.30 | 0.07 |
| 17 | 6.50 | 7 | 0.50 | 88 | 5.70 | 5 | 0.30 | 0.09 |
| 18 | 6.25 | 10 | 0.60 | 78 | 4.88 | 12 | 0.77 | 0.12 |
| 19 | 6.10 | 8 | 0.50 | 79 | 4.80 | 13 | 0.80 | 0.10 |
| 20 | 10.82 | 12 | 1.34 | 71 | 7.69 | 17 | 1.79 | 0.17 |
| 21 | 2.29 | 11 | 0.26 | 76 | 1.73 | 13 | 0.30 | 0.15 |
| 22 | 2.91 | 10 | 0.28 | 60 | 1.76 | 30 | 0.87 | 0.16 |
| 23 | 3.70 | 13 | 0.48 | 76 | 2.81 | 11 | 0.41 | 0.17 |
| 24 | 10.71 | 15 | 1.59 | 69 | 7.37 | 16 | 1.75 | 0.22 |
| 25 | 2.81 | 13 | 0.37 | 69 | 1.93 | 18 | 0.51 | 0.19 |

EXAMPLES 26 THROUGH 31

In each of the Examples 26 through 31, the same procedures as those described in Example 13 were carried out, except that the catalyst was prepared by the same method as that described in Example 8 and used in the amount as indicated in Table 4, and the reaction temperature, the pressure, composition and supply rate of the oxygen-containing gas and the reaction period of time were as indicated in Table 4. The results are indicated in Table 4.

EXAMPLES 32 THROUGH 35

In Example 32, a stainless steel reaction vessel was charged with 0.3 millimoles of a chelate salt consisting of 2,2'-bipyridyl-orthophthalatopalladium. The thus prepared reaction mixture was subjected to an oxidation-coupling reaction at a temperature of 200° C., under a pressure of 10 atmospheres on the gauge, for seven hours, while blowing a mixture gas consisting of 90% by volume of nitrogen and 10% by volume of oxygen at a supply rate of 0.5 liter/min. through the bottom of the vessel, and while stirring the reaction mixture with stirring paddles at a rotation speed of 1000 r.p.m.

In each of the Examples 33 through 35, the same procedures as those described in Example 32 were carried out, except that the palladium chelate salt consisted of one molecule of palladium nitrate and two molecules of 2,2'-bipyridyl in Example 33, one molecule of palladium nitrate and one molecule of 2,2'-bipyridyl in Example 34 and 2,2'-bipyridyl-nitrato-acetatopalladium in Example 35.

The results of the Examples 32 through 35 are indicated in Table 4.

EXAMPLES 36 THROUGH 42

In each of the Examples 36 through 42, the same procedures as those described in Example 26 were carried out, except that the amount of dimethyl orthophthalate, the composition of the catalyst used, the reaction time, the composition, pressure and supply rate of the oxygen-containing gas used, the reaction period of time were as those indicated in Table 4. The results are indicated in Table 4.

TABLE 4

| Example No. | Amount of dimethyl ortho-phthalate (m. mole) | Catalyst Pd-2,2'-pyridyl chelate compound Amount (m. mole) | Catalyst Cu-salt Type | Catalyst Cu-salt Amount (m. mole) | Temperature (°C.) | Reaction Pressure (atm.) Entire | Reaction Pressure (atm.) Partial pressure of oxygen | Content of oxygen (vol. %) | Period (hrs) | Type of reaction | Supply rate of oxygen-containing gas (l/min) |
|---|---|---|---|---|---|---|---|---|---|---|---|
| 26 | 608 | 0.4 | — | 0 | 140 | 1 | 0.2 | 20 | 8 | Gas bubble | 0.3 |
| 27 | 608 | 0.4 | — | 0 | 160 | 1 | 0.2 | 20 | 8 | " | 0.3 |
| 28 | 1520 | 1.0 | — | 0 | 160 | 10 | 1 | 10 | 7 | " | 2.0 |
| 29 | 1520 | 1.6 | — | 0 | 180 | 10 | 1 | 10 | 7 | " | 2.0 |
| 30 | 1520 | 2.0 | — | 0 | 180 | 10 | 1 | 10 | 7 | " | 2.0 |
| 31 | 1520 | 2.0 | — | 0 | 200 | 30 | 1.5 | 5 | 7 | " | 2.0 |
| 32 | 304 | 0.3 | — | 0 | 200 | 10 | 1 | 10 | 7 | " | 0.5 |
| 33 | 304 | 0.3 | — | 0 | 200 | 10 | 1 | 10 | 7 | " | 0.5 |
| 34 | 304 | 0.3 | — | 0 | 200 | 10 | 1 | 10 | 7 | " | 0.5 |
| 35 | 304 | 0.3 | — | 0 | 200 | 10 | 1 | 10 | 7 | " | 0.5 |
| 36 | 608 | 1.2 | Cu(OCOCH$_3$)$_2$ | 1.2 | 140 | 1 | 0.2 | 20 | 7 | " | 0.3 |
| 37 | 608 | 0.8 | " | 0.8 | 160 | 1 | 0.2 | 20 | 7 | " | 0.3 |
| 38 | 608 | 0.8 | " | 1.6 | 180 | 1 | 0.2 | 20 | 8 | " | 0.3 |
| 39 | 608 | 0.8 | " | 0.8 | 200 | 1 | 0.2 | 20 | 8 | " | 0.3 |

TABLE 4-continued

| Example No. | Amount of dimethyl ortho-phthalate (m. mole) | Catalyst Pd-2,2'-pyridyl chelate compound Amount (m. mole) | Cu-salt Type | Cu-salt Amount (m. mole) | Temperature (°C.) | Reaction Pressure (atm.) Entire | Reaction Pressure (atm.) Partial pressure of oxygen | Content of oxygen (vol. %) | Period (hrs) | Type of reaction | Supply rate of oxygen-containing gas (l/min) |
|---|---|---|---|---|---|---|---|---|---|---|---|
| 40 | 608 | 0.8 | " | 0.08 | 200 | 1 | 0.2 | 20 | 8 | " | 0.3 |
| 41 | 304 | 0.3 | " | 0.3 | 108 | 10 | 1 | 10 | 7 | " | 0.5 |
| 42 | 1520 | 2.0 | " | 1.0 | 200 | 30 | 1.5 | 5 | 7 | " | 2.0 |

| Example No. | Product a-BPTT Conversion (%) | a-BPTT Selectivity (%) | a-BPTT Yield (%) | S-BPTT Selectivity (%) | S-BPTT Yield (%) | By-product Selectivity (%) | By-product Yield (%) | Ratio a/s |
|---|---|---|---|---|---|---|---|---|
| 26 | 1.16 | 4 | 0.05 | 76 | 0.88 | 20 | 0.23 | 0.06 |
| 27 | 2.10 | 6 | 0.12 | 75 | 1.57 | 19 | 0.41 | 0.08 |
| 28 | 2.54 | 6 | 0.15 | 88 | 2.23 | 6 | 0.16 | 0.07 |
| 29 | 3.92 | 8 | 0.30 | 88 | 3.41 | 4 | 0.21 | 0.09 |
| 30 | 5.22 | 7 | 0.37 | 84 | 4.37 | 9 | 0.48 | 0.08 |
| 31 | 6.16 | 9 | 0.58 | 84 | 5.15 | 7 | 0.43 | 0.11 |
| 32 | 9.64 | 6 | 0.56 | 55 | 5.34 | 39 | 3.74 | 0.10 |
| 33 | 4.79 | 9 | 0.44 | 75 | 3.57 | 16 | 0.78 | 0.12 |
| 34 | 4.13 | 12 | 0.50 | 71 | 2.94 | 17 | 0.69 | 0.17 |
| 35 | 4.33 | 9 | 0.38 | 79 | 3.42 | 12 | 0.53 | 0.11 |
| 36 | 2.40 | 10 | 0.25 | 66 | 1.59 | 24 | 0.56 | 0.16 |
| 37 | 1.97 | 16 | 0.32 | 70 | 1.38 | 14 | 0.27 | 0.23 |
| 38 | 3.90 | 13 | 0.52 | 77 | 2.99 | 10 | 0.39 | 0.17 |
| 39 | 10.61 | 17 | 1.80 | 65 | 6.88 | 18 | 1.91 | 0.26 |
| 40 | 5.96 | 14 | 0.84 | 62 | 3.69 | 24 | 1.43 | 0.23 |
| 41 | 3.00 | 14 | 0.41 | 68 | 2.05 | 18 | 0.54 | 0.20 |
| 42 | 7.61 | 10 | 0.73 | 69 | 5.25 | 21 | 1.63 | 0.14 |

We claim:

1. A method for producing biphenyltetracarboxylic esters, comprising oxidative coupling, at a temperature of from 100° C. to 300° C., an orthophthalic diester by flowing a molecular oxygen-containing gas in the form of bubbles through a reaction mixture containing the orthophthalic diester and a catalyst which consists of at least one member selected from the group consisting of:
   (A) mixtures of one or more palladium salts with 2,2'-bipyridyl in a molar amount of 0.9 to 4 times that of said palladium salt, and;
   (B) chelating reaction products of one or more palladium salts with 2,2'-bipyridyl in a molar amount of 0.9 to 2.5 times that of said palladium salt.

2. A method as claimed in claim 1, wherein said orthophthalic diester is selected from those of the formula (I):

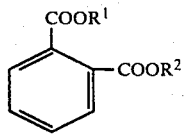

wherein $R^1$ and $R^2$ represent, independently from each other, an alkyl radical having 1 to 4 carbon atoms, respectively.

3. A method as claimed in claim 1, wherein said palladium salt is selected from the group consisting of palladium salts of organic carboxylic acids, palladium chelate salts of β-diketone compounds and palladium salts of inorganic acids.

4. A method as claimed in claim 1, wherein said palladium salt is selected from the group consisting of palladium salts of aliphatic carboxylic acids having 1 to 5 carbon atoms; palladium salts of aromatic carboxylic acids; palladium chelate salts of acetylacetone, benzoylacetone and trifuluoroacetylacetone, and; palladium salts of nitric acid, nitrous acid and sulfuric acid.

5. A method as claimed in claim 1, wherein said catalyst is used in an atomic number of palladium of 0.0001 to 0.1 per molecule of said orthophthalic diester.

6. A method as claimed in claim 1, wherein said oxidative coupling reaction is carried out at a temperature of from 140° to 230° C.

7. A method as claimed in claim 1, wherein said oxidative coupling reaction is carried out under a pressure of from 1 to 300 atmospheres.

8. A method as claimed in claim 1, wherein in said molecular oxygen-containing gas, the partial pressure of oxygen is in the range of from 0.05 to 200 atmospheres.

9. A method as claimed in claim 1 wherein the flow rate of said molecular oxygen-containing gas is in the range of from 1 to 20 liters per minute per liter of said reaction mixture.

10. A method for producing biphenyltetracarboxylic esters, comprising oxidative coupling, at a temperature of from 100° to 300° C., an orthophthalic diester by flowing a molecular oxygen-containing gas in the form of bubbles through a reaction mixture containing the orthophthalic diester and a catalyst which consists of at least one copper salt and at least one member selected from the group consisting of:
   (A) mixtures of one or more palladium salts and 2,2'-bipyridyl in a molar amount of 0.9 to 4 times that of said palladium salt, and;
   (B) chelating reaction products of one or more palladium salts with 2,2'-bipyridyl in a molar amount of 0.9 to 2.5 times that of said palladium salt.

11. A method as claimed in claim 10, wherein said copper salt is an organic copper salt.

12. A method as claimed in claim 11, wherein said organic copper salt is selected from the group consisting of copper salts of aliphatic carboxylic acids having 1 to 5 carbon atoms and copper chelate salts of β-diketones.

13. A method as claimed in claim 11, wherein said organic copper salt is used in a molar amount of from 0.01 to 10 times that of said palladium salt or chelate salt.

14. A method for producing biphenyltetracarboxylic esters, comprising oxidative coupling and orthophthalic diester by bringing a reaction mixture containing said orthophthalic diester and a catalyst which consists of at least one member selected from the group consisting of:
(A) mixtures of one or more palladium salts with 2,2'-bipyridyl in a molar amount of 0.9 to 4 times that of said palladium salt, and;
(B) chelating reaction products of one or more palladium salts with 2,2'-bipyridyl in a molar amount of 0.9 to 2.5 times that of said palladium salt, into contact with a molecular oxygen-containing atmosphere at a temperature of from 160° to 250° C.

15. A method as claimed in claim 14, wherein said orthophthalic diester is selected from those of the formula (I):

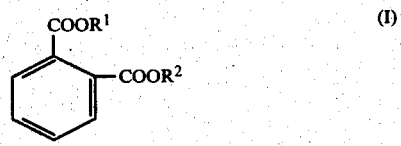 (I)

wherein $R^1$ and $R^2$ represent, independently from each other, an alkyl radical having 1 to 4 carbon atoms, respectively.

16. A method as claimed in claim 14, wherein said palladium salt is selected from the group consisting of palladium salts of organic carboxylic acids, palladium chelate salts of β-diketone compounds and palladium salts of inorganic acids.

17. A method as claimed in claim 14, wherein said palladium salt is selected from the group consisting of palladium salts of aliphatic carboxylic acids having 1 to 5 carbon atoms; palladium salts of aromatic carboxylic acids; palladium chelate salts of acetylacetone, benzoylacetone and trifuluoroacetylacetone, and; palladium salts of nitric acid, nitrous acid and sulfuric acid.

18. A method as claimed in claim 14, wherein said catalyst is used in an atomic number of palladium of 0.001 to 0.1 per molecule of said orthophthalic diester.

19. A method as claimed in claim 14, wherein said oxidative coupling reaction is carried out in the presence of at least one copper salt.

20. A method as claimed in claim 19, wherein said copper salt is selected from the group consisting of copper salts of aliphatic carboxylic acids having 1 to 5 carbon atoms and copper chelate salts of 62 -diketones.

21. A method as claimed in claim 19, wherein said copper salt is used in a molar amount of from 0.01 to 10 times that of said palladium salt or chelate salt.

22. A method as claimed in claim 14, wherein said oxidative coupling temperature is in the range of from 160° to 230° C.

23. A method as claimed in claim 14, wherein said oxidative coupling reaction is carried out under a pressure of from 2 to 300 atmospheres.

24. A method as claimed in claim 14, wherein the partial pressure of oxygen in said oxidative coupling atmosphere is in the range of from 2 to 200 atmospheres.

* * * * *